United States Patent
Olsson et al.

(10) Patent No.: US 9,403,216 B2
(45) Date of Patent: Aug. 2, 2016

(54) FIRST COUPLING PART AND TOOL COUPLING

(71) Applicant: SANDVIK INTELLECTUAL PROPERTY AB, Sandviken (SE)

(72) Inventors: Soren Olsson, Sandviken (SE); Gunnar Mätlik, Gavle (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days.

(21) Appl. No.: 14/249,385

(22) Filed: Apr. 10, 2014

(65) Prior Publication Data

US 2014/0305268 A1    Oct. 16, 2014

(30) Foreign Application Priority Data

Apr. 11, 2013   (SE) ..................................... 1350457

(51) Int. Cl.
  *B23B 31/10*   (2006.01)
  *B23B 29/12*   (2006.01)
  *B23B 29/04*   (2006.01)
  *B23B 31/113*  (2006.01)
  *B23B 31/11*   (2006.01)

(52) U.S. Cl.
  CPC .............. *B23B 29/12* (2013.01); *B23B 29/046* (2013.01); *B23B 31/113* (2013.01); *B23B 2210/08* (2013.01); *B23B 2231/0204* (2013.01); *Y10T 82/2589* (2015.01)

(58) Field of Classification Search
  CPC .... B23B 31/261; B23B 31/008; B23B 31/11; B23B 29/04; B23C 5/10
  See application file for complete search history.

(56) References Cited

U.S. PATENT DOCUMENTS

| | | | | |
|---|---|---|---|---|
| 5,193,954 | A * | 3/1993 | Hunt | 409/233 |
| 6,193,451 | B1 * | 2/2001 | Åsberg | 409/233 |
| 6,370,995 | B1 * | 4/2002 | Skoog | 82/160 |
| 7,101,127 | B2 * | 9/2006 | Kimura et al. | 409/232 |
| 7,341,409 | B2 * | 3/2008 | Jonsson et al. | 408/233 |
| 7,775,751 | B2 * | 8/2010 | Hecht et al. | 408/57 |
| 8,226,333 | B2 * | 7/2012 | Kakai et al. | 407/54 |
| 8,596,937 | B2 * | 12/2013 | Hecht | 408/153 |
| 8,764,353 | B2 * | 7/2014 | Oettle | 408/56 |
| 2004/0022594 | A1 * | 2/2004 | Hecht | 408/231 |

FOREIGN PATENT DOCUMENTS

| | | |
|---|---|---|
| GB | 1152864 | 5/1969 |
| WO | 03101650 A1 | 12/2003 |

* cited by examiner

*Primary Examiner* — Will Fridie, Jr.
(74) *Attorney, Agent, or Firm* — Corinne R. Gorski

(57) ABSTRACT

A first coupling part interacts with a second coupling part of a tool coupling. The first coupling part has a first body and a conical pin, which extends from the first body along a center axis (x) to an end surface. The conical pin is insertable into a conical seat. The conical pin comprises a cavity, which extends from the end surface and comprises a number of first protuberances, which are separated and arranged at a distance from each other along a circumferential direction in respect to the center axis so that there are formed a corresponding number of first recesses. The first protuberances form a respective first contact surface and interact with a corresponding number of separated, second contact surfaces of a pull member of the second coupling part. The first contact surfaces form an acute angle with the center axis.

22 Claims, 8 Drawing Sheets

FIRST COUPLING PART AND TOOL COUPLING

RELATED APPLICATION DATA

This application claims priority under 35 U.S.C. §119 to SE Patent Application No. 1350457-6, filed on Apr. 11, 2013, which the entirety thereof is incorporated herein by reference.

TECHNICAL FIELD AND INDUSTRIAL APPLICABILITY

The present disclosure relates to a tool coupling for the interconnection of a first coupling part and a second coupling part. The tool coupling is designed for quick tool exchange of a tool, for instance a cutting tool that is held by the first coupling part or the second coupling part.

BACKGROUND

U.S. Pat. No. 6,193,451 discloses a tool coupling having a first coupling part having a conical pin, and a second coupling part that has a conical seat. The conical pin of the first coupling part is insertable into the conical seat of the second coupling part, and from an inserted position, the first coupling part can be clamped in the conical seat by means of a pull member, which acts on a number of segments that, when the pull member is retracted, are displaced outward and engage a circumferential recess of a cavity of the conical pin. In that connection, the conical pin is pulled into the conical seat so that a support surface of the first coupling part lies flat against a corresponding support surface of the second coupling part in a plane perpendicular to the center axis of the coupling parts. This tool coupling works very well and is used in many different machine tools. Because the pull member presses the walls of the conical pin outward at the same time as the support surfaces abut against each other, a very rigid clamping of the first coupling part in an exact and predetermined positioning is obtained.

A disadvantage of this solution is, however, that the tool coupling contains many movable parts in the interface between the first coupling part and the second coupling part. Therefore, the tool coupling becomes sensitive to dirt and particles that may enter particularly into the area of the segments and contribute to the tool coupling seizing or in the worst case interconnecting the coupling parts in a less exact position. In addition, in small dimensions of the tool coupling, the manufacture of the individual parts and the handling and the mounting of the tool coupling with the many parts included are complicated.

SE-303658 offers a possible solution to these complex problems and discloses a kind of bayonet coupling that allows replacement of the segments of the tool coupling according to U.S. Pat. No. 6,193,451 by a pull member that, together with the first coupling part in the cavity of the conical pin, forms a bayonet coupling. The tool coupling that is shown in SE-303658 is, however, less exact and should, therefore, not able to guarantee any exact positioning of the first coupling part in relation to the second coupling part, neither in the axial direction nor in a circumferential direction.

The present disclosure recognizes such, by the fact that the first coupling part is turned in relation to the pull member, there arises an uncertainty about the final position of the first coupling part in the circumferential direction. Further, no specific abutment in the axial direction is demonstrated, which means that the axial position of the first coupling part is not exactly defined.

SUMMARY

An object of the present disclosure is to obviate the problems discussed above and to provide an improved first coupling part and an improved tool coupling. A tool coupling being suitable for tools having relatively small dimensions is particularly aimed at.

This object is achieved by the first coupling part that is indicated by way of introduction and characterized in that the first contact surfaces form an acute angle with the center axis.

By means of such leaning first contact surfaces, the pull member can, by its corresponding second contact surfaces, act directly on the first contact surfaces and press the same backward in the second coupling part. The recesses between the protuberances allow introduction of the second contact surfaces of the pull member of the second coupling part, whereupon the pull member can be rotated until the second contact surfaces are located opposite the first contact surfaces.

The acute angle of the first contact surfaces allows a force to be formed that is radially outwardly directed and acts on the conical pin, which contributes to the outer surface of the conical pin abutting and being pressed against the conical inner surface of the seat, at least radially outside the protuberances and the first contact surfaces.

Since the pull member acts directly on the first contact surfaces, the pulling motion of the pull member can be transferred to the conical pin without any mutual slip between the first and second contact surfaces, which decreases the wearout and is an advantage in relation to the art shown in U.S. Pat. No. 6,193,451, wherein slip between the pull member and the segments arises. In other, similar solutions according to prior art, slip may also arise between the segments and the recess in the cavity of the conical pin.

According to one embodiment of the disclosure, each first protuberance has an interior surface facing the center axis and a smallest extension in the circumferential direction along the interior surface, the smallest extension being less than said distance between the first protuberances. In relation to the art shown in SE-303658, this allows a relatively large contact area between the first and second contact surfaces. Since the second contact surfaces should be inserted behind the first contact surfaces, rotated and then pulled toward the first contact surfaces, the extension of the first contact surfaces in the circumferential direction will be less than 180°, and the same applies to the total extension of the second contact surfaces in the circumferential direction.

According to a further embodiment, the first contact surfaces are conical, and may accordingly form a cone angle with the center axis. This cone angle may be between 30 and 60°, for instance 45°.

According to a further embodiment, the first body forms a first support surface around the conical pin, the first support surface being formed to abut against an opposite second support surface of the second coupling part. Advantageously, the first support surface may be flat, the center axis being perpendicular to the first support surface. Thus, the first support surface guarantees an exact axial positioning of the first coupling part in relation to the second coupling part when the first support surface abuts against the second support surface.

According to a further embodiment, the first coupling part is formed to allow securing of the conical pin in at least one determined rotary position on the center axis in relation to the second coupling part. Advantageously, the conical pin may be polygonally conical and have a polygonal external cross-section in respect of the center axis for the co-operation with a corresponding cross-section of the conical seat of the second coupling part for the achievement of the securing. The polygonal external cross-section may include two, three, four, or more corners. Advantageously, the polygonal external cross-section of the conical pin may have rounded corners, each recess being arranged radially inside a respective rounded corner. Thus, the first protuberances will be positioned radially inside the area between the rounded corners. In these areas, the thickness of material of the conical pin will be somewhat less than at the rounded corners, which allows an improved elasticity of the conical pin in those areas where the first and second contact surfaces are pressed against each other.

According to a further embodiment, the cavity has a circular shape, the first protuberances extending inward toward the center from the circular shape.

The object is achieved by the tool coupling that is indicated by way of introduction and characterized in that the first contact surfaces form an acute angle with the center axis, and that the second contact surfaces form an acute angle with the longitudinal axis.

According to one embodiment of the invention, the second coupling part includes an operating mechanism, which acts on the pull member in such a way that the pull member is rotatable on the longitudinal axis from a first rotational position to a second rotational position, in which the first and second contact surfaces are positioned right opposite each other, and from the second rotational position displaceable in the direction of the longitudinal axis to a coupling position, in which the first and second contact surfaces are pressed against each other and the first coupling part and the second coupling part are interconnecting with each other.

According to a further embodiment, the pull member has a drawbar and a pull head, on which the second contact surfaces are arranged. Advantageously, the operating mechanism may include an operating tool for the manual rotation and displacement of the pull member, or alternatively a driving member for the mechanized or automatized rotation and displacement of the pull member. Such a driving member may have an electric, pneumatic, or hydraulic motor.

According to a further embodiment of the invention, the operating mechanism includes a control member that has an engagement member that is accessible for an operating tool, the control member being rotatable on the longitudinal axis for the rotation of the pull member between the first rotational position and the second rotational position. Advantageously, the control member may be rotatably arranged in the second coupling part on an axis perpendicular to the longitudinal axis, the control member having an eccentric circumferential surface, which acts in a transverse opening of the pull member for the displacement to the coupling position.

According to further embodiments, the first coupling part of tool coupling may have one or more of the features mentioned above.

These and other objects, features, aspects, and advantages of the present disclosure will become more apparent from the following detailed description of the preferred embodiment relative to the accompanied drawings, in which:

DETAILED DESCRIPTION

Figure 1:
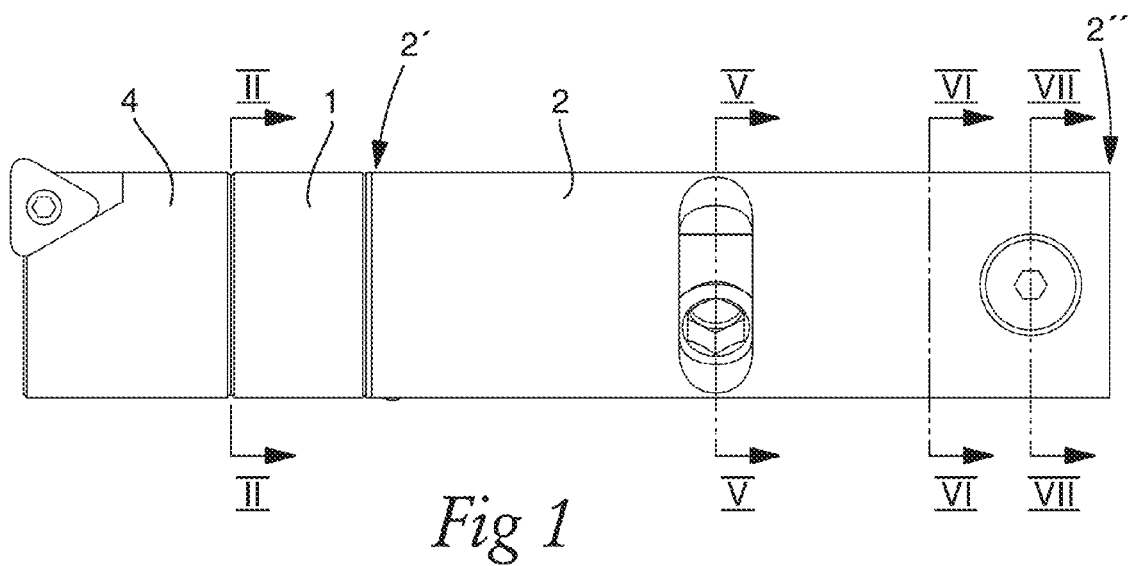
FIG. 1 is a side view of a tool device having a tool and a tool coupling according to the disclosure.
Figure 2:
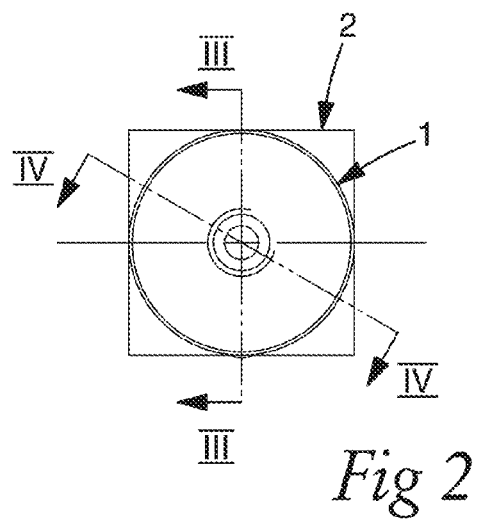
FIG. 2 is a cross-sectional view taken along line II-II of FIG. 1.

FIG. 1 shows a tool coupling having a first coupling part 1 and a second coupling part 2, which interact with each other. The second coupling part 2 has a front end 2' and a rear end 2". The rear end 2" is formed to be attached in a machine tool, for instance an automatized multi-operation machine.

Figure 3:
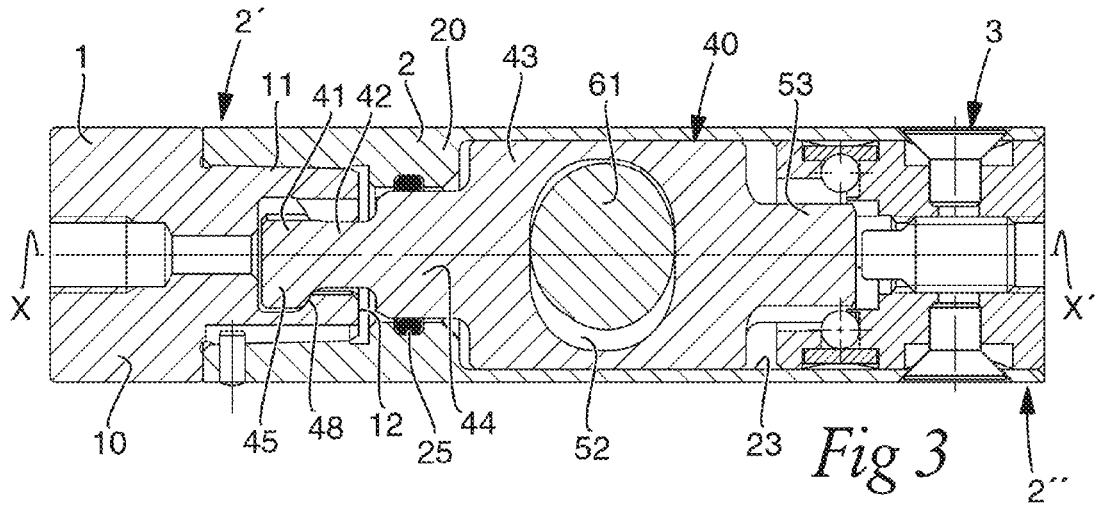
FIG. 3 is a longitudinal cross-sectional view taken along line III-III of FIG. 2.
Figure 9:
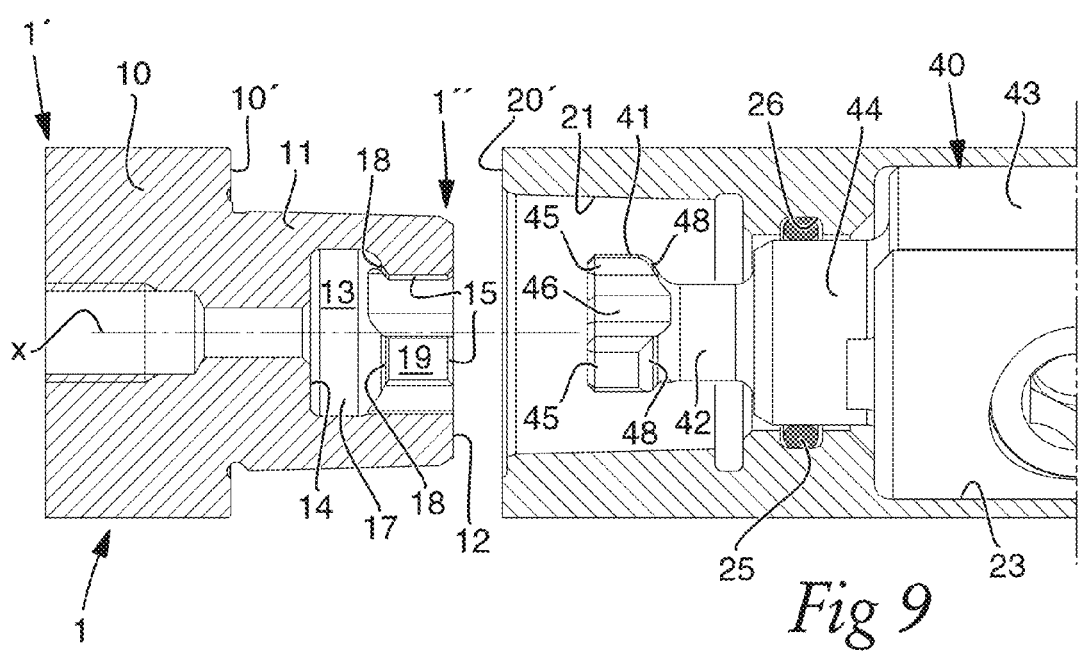
FIG. 9 is a partial sectional view of a first coupling part and a second coupling part of the tool coupling of FIG. 1 in a non-coupled state.

The first coupling part 1 includes a front end 1' and a rear end 1", as shown in FIG. 9. The front end 1' is formed to receive a tool 4 having, for instance, a turning insert, one or more milling inserts, one or more drilling inserts, etc. The tool may also be integrated with the first coupling part 1. The first coupling part 1 extends along a center axis x, refer to FIGS. 3 and 4. The second coupling part 2 extends along a longitudinal axis x' that also forms a center axis of the second coupling part 2.

Figure 8:
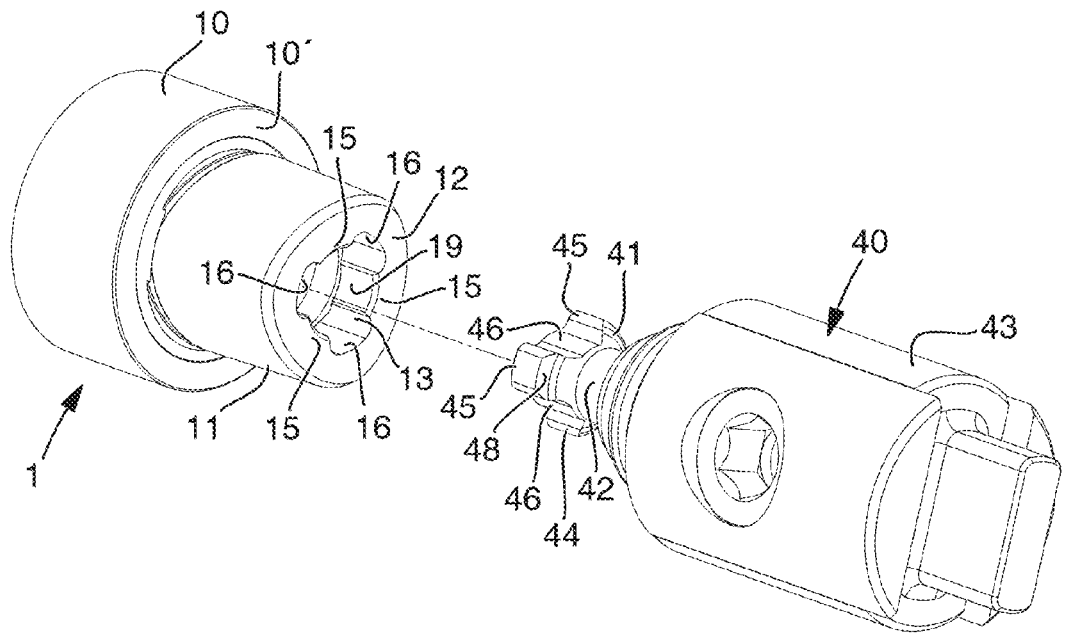
FIG. 8 is a perspective view of parts of the tool coupling of FIG. 1.

The first coupling part 1 includes a first body 10 and a conical pin 11, which extends from the first body 10 along the center axis x to an end surface 12, see FIGS. 8 and 9. In the embodiments shown, the first body 10 has a circular-cylindrical cross-section. The conical pin 11 has a decreasing diameter from the first body 10 to the end surface 12. The conical pin 11 forms a constant cone angle with the center axis x around the circumference of the entire pin. This cone angle may be of the order of 1-5°. The cone angle is advantageously constant, or essentially constant, around the entire conical pin 11.

The conical pin 11 has a cavity 13, which extends from the end surface 12 to a bottom surface 14. The cavity 13 includes three first protuberances 15, which are separated from each other and uniformly distributed at a distance from each other along a circumferential direction in respect of the center axis x, see FIGS. 8, 12, and 13. Between adjacent first protuberances 15, there are first recesses 16 that are arranged in such a way that the first recesses 16 and the first protuberances 15 alternate with each other in the circumferential direction. Here, it should be noted that the cavity 13 may have another number of first protuberances 15 and first recesses 16 than three, for instance two first protuberances 15 and two first recesses 16, four, five, or six first protuberances 15 and first recesses 16.

The first protuberances 15 and the first recesses 16 extend from the end surface 12 and are positioned at a distance from the bottom surface 14. Thus, there is an inner space 17 of the cavity 13 between the bottom surface 14 and the first protuberances 15. Advantageously, the circumferential surface of the interior space 17 may be located at the same distance, or essentially the same distance, from the center axis x as the bottom surface of the first recesses 16. In other words, the cavity 13 may have a circular, or circular-cylindrical, shape, the first protuberances 15 extending inward from this shape toward the center axis x.

Figure 4:
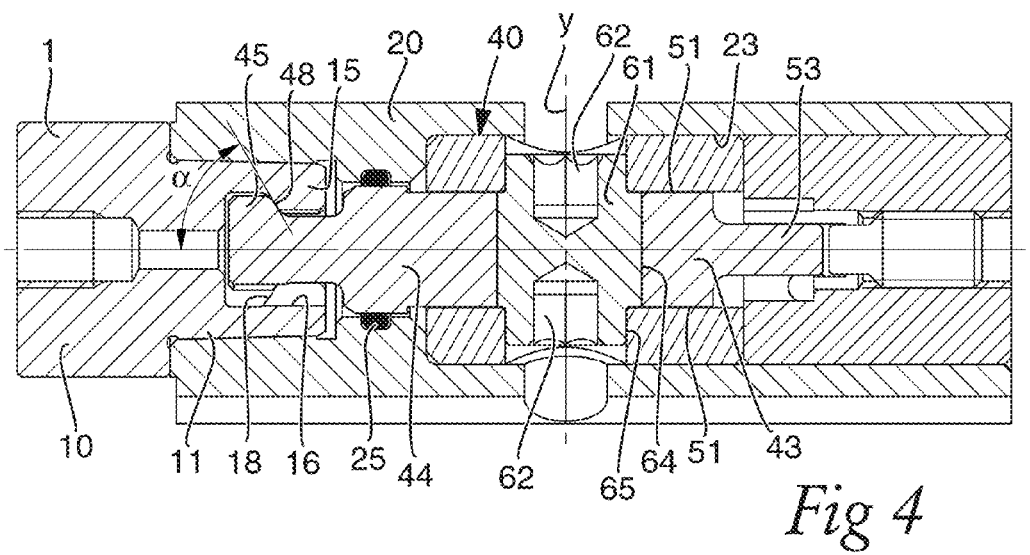
FIG. 4 is a longitudinal cross-sectional view taken along line IV-IV of FIG. 2.

Each first protuberance 15 forms a first contact surface 18 that faces the bottom surface 14 and forms an acute angle α with the center axis x, refer to FIG. 4. The acute angle α may be between 30 and 60°, for instance 45°.

Advantageously, the first contact surfaces 18 may be conical. The first contact surfaces may also be cambered, i.e., they may have a weak arching and a relatively large radius.

Furthermore, each first protuberance 15 has an interior surface 19 that faces the center axis x, and that advantageously may be parallel to the center axis x. The interior surface 19 has a smallest extension in the circumferential direction along the interior surface 19, and this smallest extension is less than the distance between the first protuberances 15, or less than the width of the recesses 16 in the circumferential direction.

Furthermore, the first body 10 forms a first support surface 10', which extends around the conical pin 11. The first support surface 10' is flat. The center axis x is perpendicular, or essentially perpendicular, to the first support surface 10'.

The second coupling part 2 includes a second body 20 and, at the front end 2', a second support surface 20' that is flat. The longitudinal axis x' is perpendicular to the second support surface 20'. In the embodiments shown, the second body 20 has an elongate shape with a quadratic cross-section.

The second coupling part 2 has a conical seat 21, which extends inward in the second body 20 and backward from the second support surface 20' toward the rear end 2" along the longitudinal axis x'. The conical seat 21 forms an angle with the longitudinal axis x'. This angle may be somewhat less, of the order of hundredths of a degree, than the angle of the conical pin 11 in relation to the center axis x. In such a way, a small over-determination of the conical pin 11 in relation to the conical seat 21 may be achieved, wherein the conical pin 11 at the first support surface 10' will abut against the conical seat 21 in the vicinity of the second support surface 20' with press fit when the conical pin 11 is entirely inserted in the conical seat 21 and the first support surface 10' abuts against the second support surface 20'.

Upon interconnection of the first coupling part 1 and the second coupling part 2, the conical pin 11 is inserted into the conical seat 21 so that the conical surface of the conical pin 11 and the conical surface of the conical seat 21 abut against each other. After further interconnection steps, which will be explained in more detail below, the first coupling part 1 is pulled into the second coupling part 2 so far that the first support surface 10' abuts and is pressed against the second support surface 20'.

Here, it should be noted that the first coupling part 1 may be formed to allow securing of the conical pin 11 in at least one or a plurality of fixed rotary positions on the center axis x in relation to the second coupling part 2. In the embodiment illustrated, this rotational securing has been attained by the conical pin 11 having a polygonal external cross-section in respect of the center axis x, which interacts with a corresponding polygonal cross-section of the conical seat 21 of the second coupling part 2. In the embodiment illustrated, particularly referring to FIGS. 12 and 13, this polygonal cross-section of the conical pin 11 is triangular with three rounded corners 31 and three straighter or less rounded intermediate sections 32 between the same. The rounded corners 31 have a shorter, or considerably shorter, radius of curvature than the intermediate sections 32. As mentioned, the conical seat 21 has a corresponding polygonal shape with three rounded corners and three intermediate sections, which is seen in FIGS. 16-19.

Figure 12:
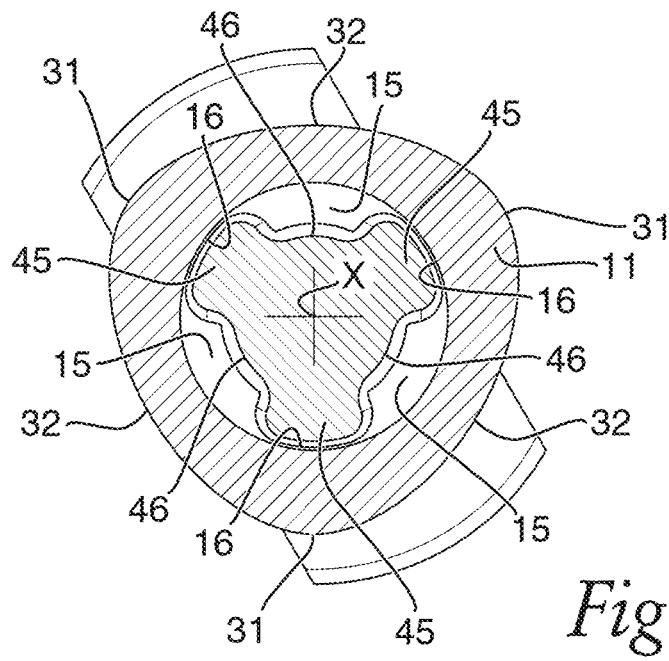
FIG. 12 is a cross-sectional view of the first and second coupling parts in a first rotational position.
Figure 13:
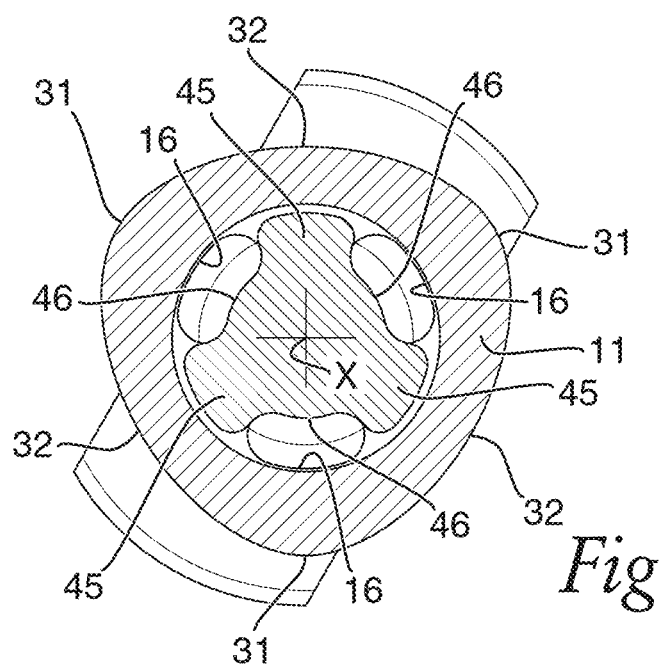
FIG. 13 is a cross-sectional view of the first and second coupling parts in a second rotational position.

As seen in FIGS. 12 and 13, each rounded corner 31 of the conical pin 11 is arranged radially outside a respective first recess 16. This means that each first protuberance 15 of the conical pin 11 is arranged radially inside a respective intermediate section 32.

The second coupling part 2 comprises a pull member 40 having a pull head 41 and a drawbar 42, particularly referring to FIGS. 3, 4, 8, and 9. The pull head 41 includes three second protuberances 45, which are separated from each other and arranged at a distance from each other along a circumferential direction in respect of the longitudinal axis x', refer to FIGS. 12 and 13. Thus, between adjacent second protuberances 45, there is a second recess 46, so that also the three second protuberances 45 and the three second recesses 46 alternate with each other in the circumferential direction around the pull head 41.

Each second protuberance 45 forms a second contact surface 48. Advantageously, the second contact surfaces 48 form the same angle with the longitudinal axis x' as the above-mentioned angle α.

The second contact surfaces 48 may advantageously be conical in the same way as the first contact surfaces 16. Also the second contact surfaces 48 may be cambered, i.e., they may have a weak arching and a relatively large radius. Particularly, either the first contact surfaces 18 or the second contact surfaces 48 may be cambered.

Figure 10:
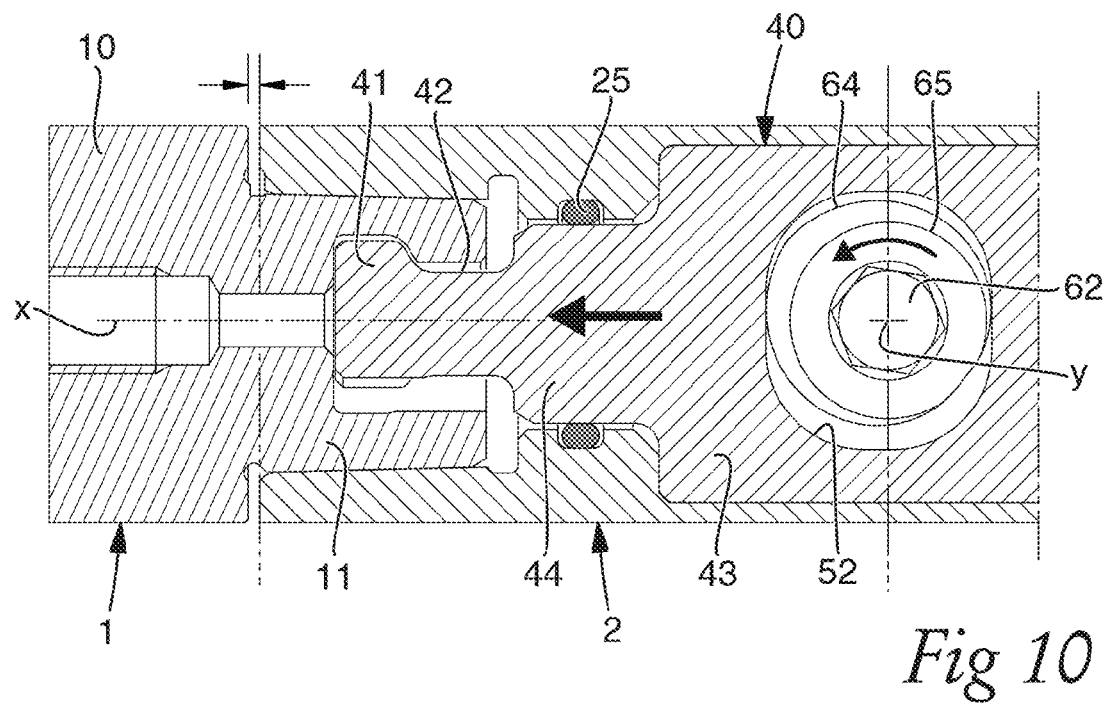
FIG. 10 is a longitudinal cross-sectional view of the first and second coupling parts in an intermediate state.
Figure 11:
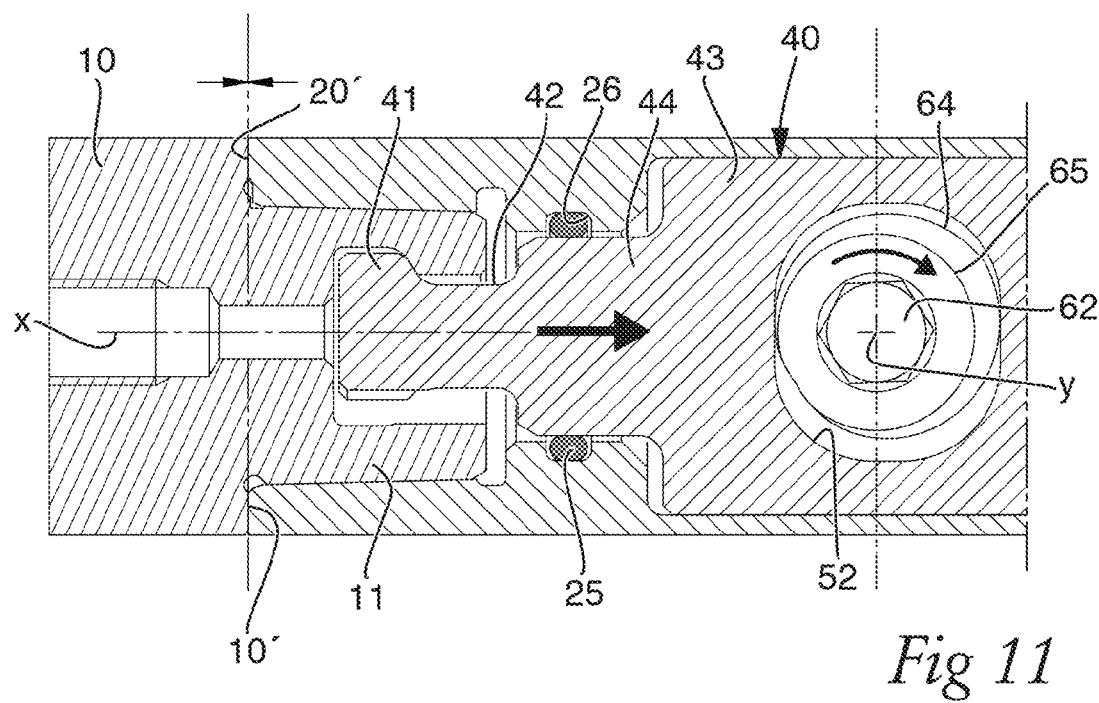
FIG. 11 is a longitudinal cross-sectional view of the first and second coupling parts in a coupled state.

Thus, upon interconnection of the coupling parts 1 and 2, the conical pin 11 is inserted into the conical seat 21. Simultaneously, the pull member 40 is inserted into the cavity 13, refer to FIG. 10, the pull member 40 being in a first rotational position, which is illustrated in FIG. 12. After that, the pull member 40 is rotated to a second rotational position, which is illustrated in FIG. 13. After that, the pull member 40 is displaced backward toward the rear end 2" of the second coupling part 2 until the second contact surfaces 48 abut against the first contact surfaces 18, whereupon further displacement backward of the pull member 40 result in complete drawing-in of the conical pin 11 into the conical seat 21 so that the first support surface 10' abuts against the second support surface 20' in a coupling position, as shown in FIG. 11. At least in this coupling position, the center axis x coincides with the longitudinal axis x'.

When the first contact surfaces 18 are pressed against the second contact surfaces 48, there arises no, or essentially no, mutual slip between said surfaces 18 and 48. All force from the pull head 41 is transferred to the first contact surfaces 18 and the conical pin 11, the conical pin 11 at the first protuberances 15 and the intermediate sections 32 being pressed outward.

The pull member 40 includes a main part 43 that is arranged in a circular-cylindrical cavity 23 of the second body 20 and that is displaceable in the circular-cylindrical cavity 23 along the longitudinal axis x' and rotatable on the longitudinal axis x'. The pull member 40 has a transition part 44 between the main part 43 and the drawbar 42. A sealing ring 25 is arranged in an annular groove 26 of the second body 20 and abuts sealingly against the transition part 44, as seen in FIG. 9. In such a way, the space around the pull head 41 in the conical seat 21 is sealed. This sealing prevents dirt and lubricant from penetrating into this space from the circular-cylindrical cavity 23 and the rear parts of the second coupling part 2. In addition, cooling liquid and dirt are prevented from penetrating into the circular-cylindrical cavity 23.

Figures 5, 6, 7:
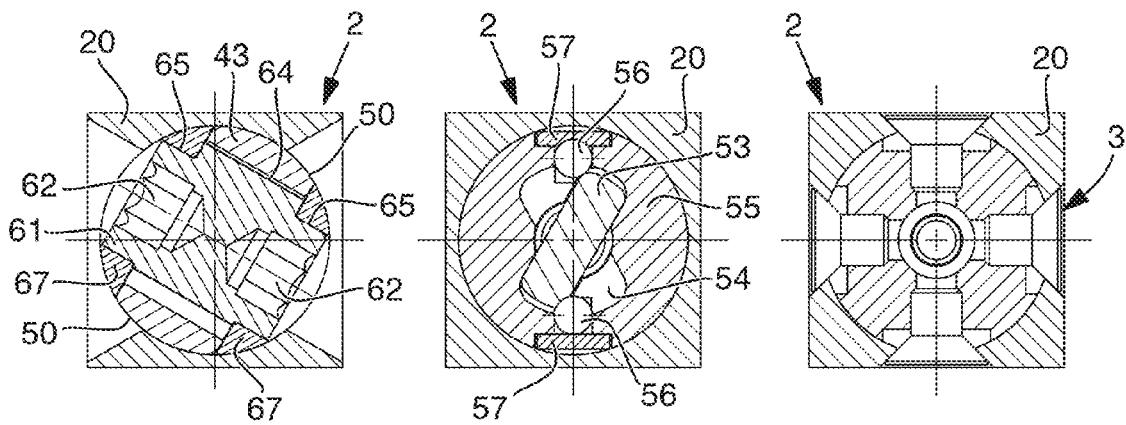
FIG. 5 is a cross-sectional view taken along line V-V of FIG. 1.
FIG. 6 is a cross-sectional view taken along line VI-VI of FIG. 1.
FIG. 7 is a cross-sectional view taken along line VII-VII of FIG. 1.
Figure 14:
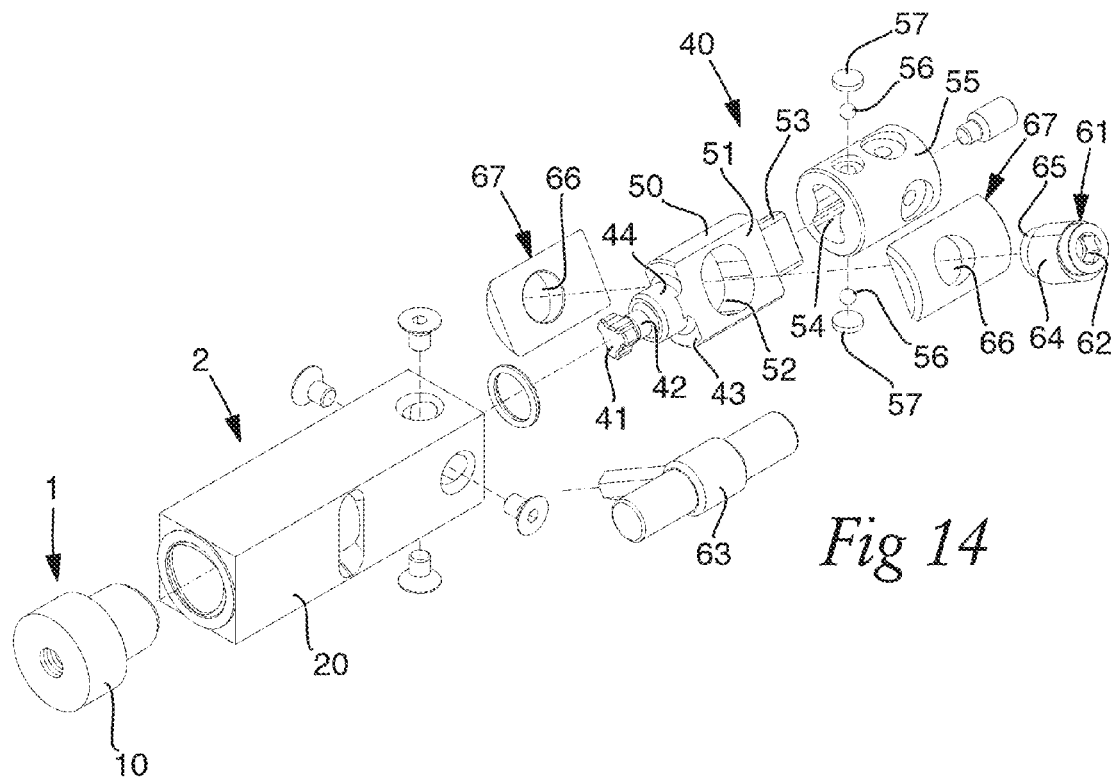
FIG. 14 is a first exploded diagram of the tool coupling of FIG. 1.
Figure 15:
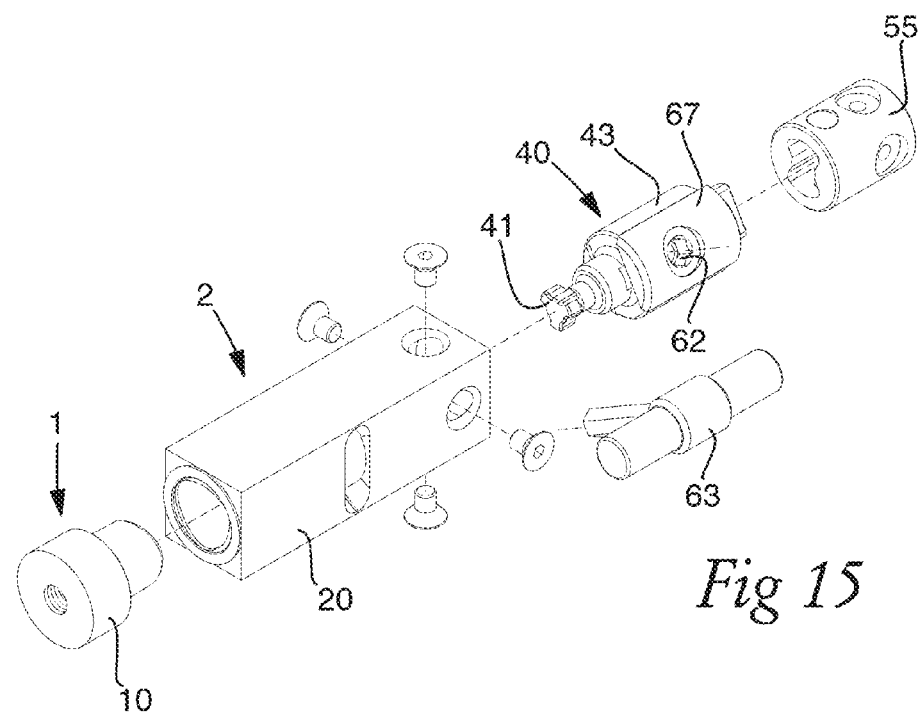
FIG. 15 is a second exploded diagram of the tool coupling of FIG. 1.
Figure 16:
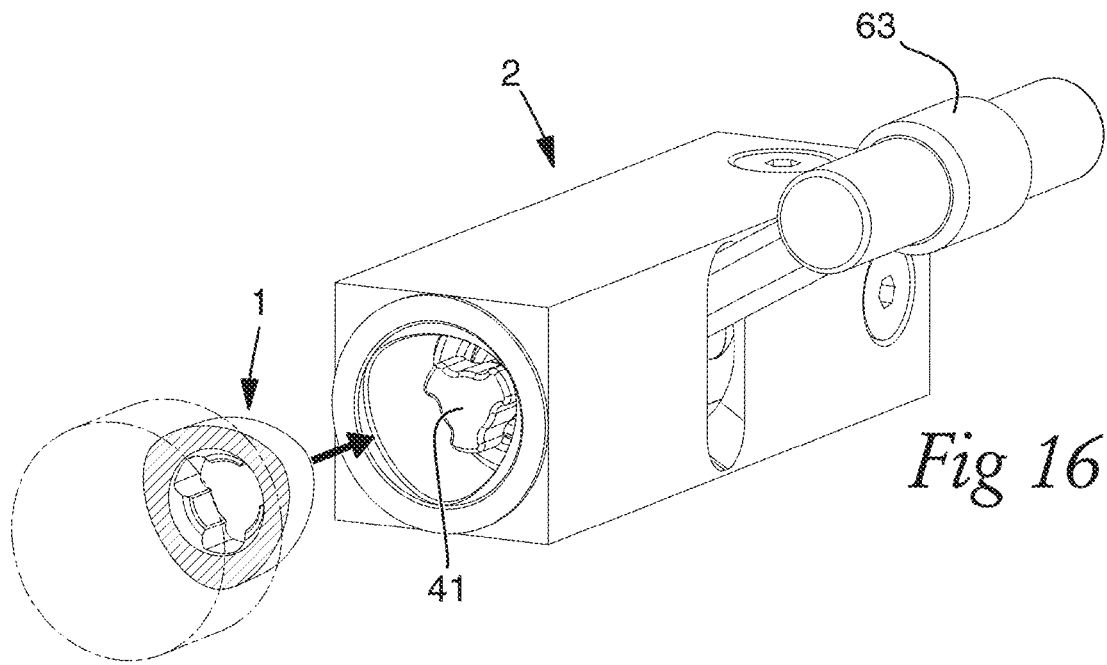
FIGS. 16-19 are perspective views of the tool coupling with an operating tool in different functional positions.
Figure 17:
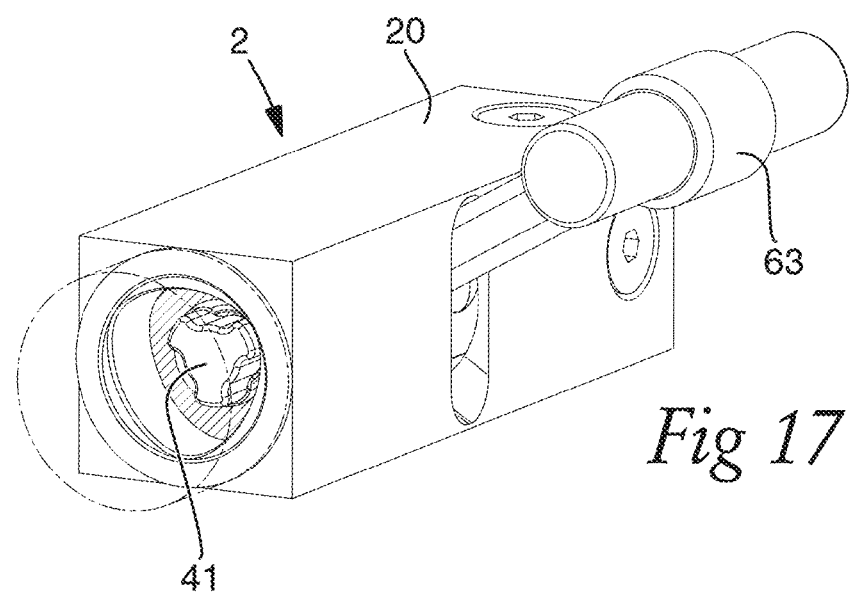
Figure 18:
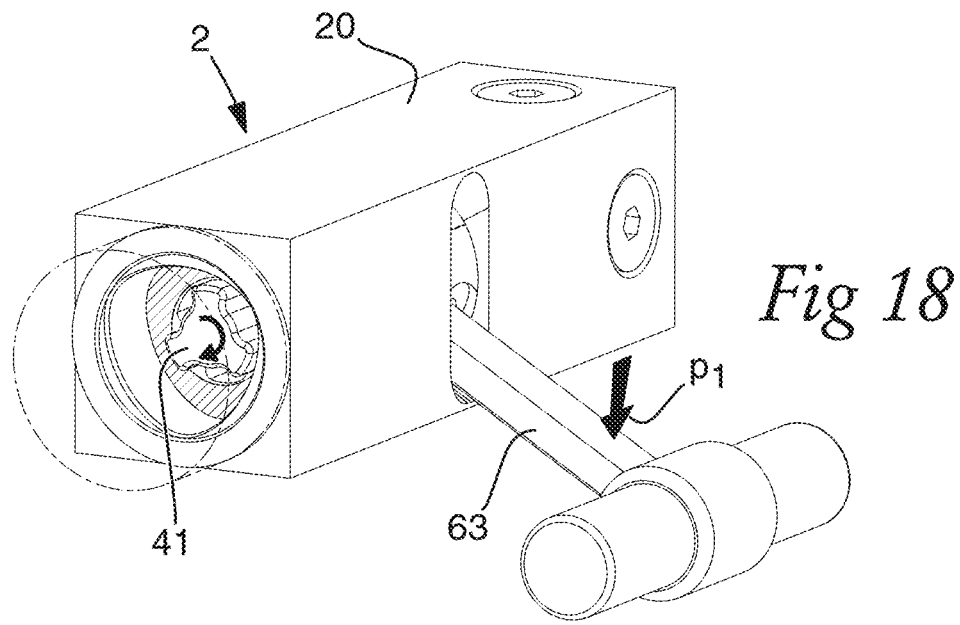
Figure 19:
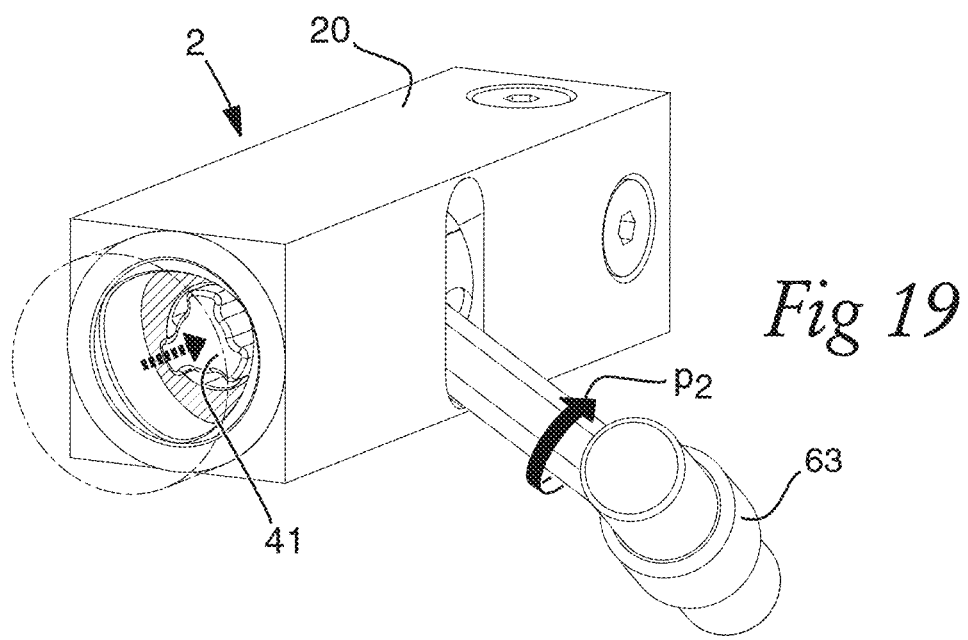

As seen in FIGS. 14 and 15, the main part 43 of the pull member 40 has two opposite circular-cylindrical surfaces 50 that abut against the circular-cylindrical cavity 23, also shown in FIG. 5. The main part 43 has also two opposite flat surfaces 51, which are parallel to each other and extend between and connect the two circular-cylindrical surfaces 50. A transverse opening 52 having an elongate shape extends through the main part 43 and the two flat surfaces 51.

The pull member 40 is, as mentioned above, rotatable, and more precisely between a first rotational position and a second rotational position. These two rotational positions may be defined in various ways. In the embodiment illustrated, one example is shown. The pull member 40 comprises in that connection a pin 53, which extends backward toward the rear end 2" and has a rectangular cross-section. The pin 53 engages a recess 54 of a locking block 55 of the second coupling part 2. The locking block 55 is secured in the second coupling part 2 by means of four screws 3. The recess 54 has an elongate cross-sectional shape with a narrower waist. This cross-sectional shape of the recess 54 defines the two rotational positions of the rotation of the pin 53 and thereby of the pull member 40, as seen in FIG. 6. By means of two opposite balls 56, which are biased by a respective spring washer 57, the pin 53 and thereby the pull member 40 are held in the first rotational position and the second rotational position, respectively.

The second coupling part 2 also includes an operating mechanism, which is associated with and interacts with the pull member 40 for providing the displacement and rotation thereof. The operating mechanism comprises a control member 61, which comprises an engagement member 62, which is accessible for an operating tool 63.

In the embodiment illustrated, the control member 61 has an eccentric circumferential surface 64 and a circular-cylindrical surface 65 on each side of the circumferential surface 64. The eccentric circumferential surface 64 is positioned in the elongate hole 52 of the main part 43. The two circular-cylindrical surfaces 65 are journaled in a respective circular-cylindrical hole 66 of a respective bearing element 67. The two bearing elements 67 abut against a respective flat surface 51 of the main part 43. The two bearing elements 67 have a circular outer surface, which connects to the circular-cylindrical surfaces 50 of the main part 43 and abuts against the circular-cylindrical cavity 23.

The control member 61 is, together with the pull member 43, rotatable on the longitudinal second axis x' for the rotation of the pull member 40 between the first rotational position and the second rotational position. This rotation may be provided by means of the operating tool 63, which is inserted into the engagement member 62 and rotated in the direction of the arrow $p_1$ (FIG. 18) on the longitudinal axis x'. The engagement member 62 can have a hexagon hole and the operating tool 63 a hexagon spanner.

The control member 61 is also rotatable on a transverse axis y, as shown in FIG. 4, which is perpendicular to the longitudinal axis x'. When the control member 61, by means of the operating tool 63, is rotated in the direction of the arrow $p_2$ on the transverse axis y, see FIG. 19, the eccentric circumferential surface 64 will act in the transverse opening 52 of the main part 43 and displace the pull member 40 along the longitudinal axis x', between the position shown in FIG. 10, where the contact surfaces 18 and 48 do not abut against each other, and the position shown in FIG. 11, where the contact surfaces 18 and 48 abut and are pressed against each other.

The interconnection of the first coupling part 1 and the second coupling part 2 can accordingly be effected in a fast and easy way. After the conical pin 11 here has been inserted into the conical seat 21, the pull head 41 is rotated, in the embodiments shown, by means of the operating tool 63 by the same being rotated on the longitudinal axis x'. After that, the pull head 41 is pulled backward by the operating tool 63 being rotated on the transverse axis y, i.e., on its own axis.

It should be noted that the operating mechanism shown should be seen as an advantageous embodiment of such a one for manual clamping of the first coupling part 1 in the second coupling part 2. Such a manual operating mechanism may be formed in many alternative ways as well as also parts of the pull member 40, such as the main part 43 with the pin 53, the drawbar 42, and the transition part 44. It should also be noted that the operating mechanism shown may be replaced by an operating mechanism that actuates the pull head 41 via a drawbar and is designed for automatized clamping of the first coupling part 1 in the second coupling part 2.

Although the present disclosure has been described in relation to particular embodiments thereof, many other variations and modifications and other uses will become apparent to those skilled in the art. It is preferred therefore, that the present disclosure be limited not by the specifics disclosed herein, but only by the appended claims.

The invention claimed is:

1. A first coupling part that interacts with a second coupling part of a tool coupling, the first coupling part comprising:
   a first body; and
   a conical pin extending from the first body along a center axis to an end surface and having a decreasing diameter from the first body to the end surface, the conical pin being insertable into a conical seat, which extends along a longitudinal axis of the second coupling part such that the center axis and the longitudinal axis coincide, the conical pin including a cavity having a bottom surface opposed to the end surface, the cavity extending axially along the center axis from the end surface to the bottom surface and including a number of first protuberances, the number of first protuberances being separated and arranged at a distance from each other along a circumferential direction with respect to the center axis and forming therebetween a corresponding number of first recesses, the number of first protuberances being arranged at a distance from the bottom surface and each forming a respective first contact surface facing the bottom surface, wherein the first contact surfaces interact with a corresponding number of separated, second contact surfaces of a pull member of the second coupling part, each respective first contact surface forming an acute angle with the center axis, wherein the acute angle of each of the first contact surfaces is configured to allow a force to be formed that is radially outwardly directed and acts on the conical pin, which force contributing to an outer surface of the conical pin abutting and being pressed against an conical inner surface of the seat, at least radially outside the protuberances and the first contact surfaces.

2. The first coupling part according to claim 1, wherein each first protuberance has an interior surface facing the center axis and a smallest extension in the circumferential direction along the interior surface, and wherein the smallest extension is less than said distance between the first protuberances.

3. The first coupling part according to claim 1, wherein the first contact surfaces are conical.

4. The first coupling part according to claim 1, wherein the first body forms a first support surface around the conical pin, and wherein the first support surface is formed to abut against an opposite second support surface of the second coupling part.

5. The first coupling part according to claim 4, wherein the first support surface is flat, and wherein the center axis is perpendicular to the first support surface.

6. The first coupling part according to claim 1, wherein the first coupling part is formed to allow securing of the conical pin in at least one determined rotary position on the center axis in relation to the second coupling part.

7. The first coupling part according to claim 6, wherein the conical pin has a polygonal external cross-section with respect to the center axis for co-operation with a corresponding cross-section of the conical seat of the second coupling part for securing the conical pin.

8. The first coupling part according to claim 7, wherein the polygonal external cross-section of the conical pin is a rounded corner, and wherein each first recess is arranged radially inside a respective rounded corner.

9. The first coupling part according to claim 8, wherein the cavity has a circular shape, and wherein the first protuberances extends inward toward the center axis from the circular shape.

10. A tool coupling comprising:
a first coupling part having a first body and a conical pin extending from the first body along a center axis to an end surface and having a decreasing diameter from the first body to the end surface; and
a second coupling part, the first and second coupling part being formed to interact with each other, the second coupling part including a conical seat, which extends along a longitudinal axis of the second coupling part, the conical pin being insertable into the conical seat such that the center axis and the longitudinal axis coincide, the conical pin including a cavity having a bottom surface opposed to the end surface, the cavity extending axially along the center axis from the end surface to the bottom surface and having a number of first protuberances, the number of first protuberances being separated and arranged at a distance from each other along a circumferential direction with respect to the center axis and forming therebetween a corresponding number of first recesses, the number of first protuberances being arranged at a distance from the bottom surface and each forming a respective first contact surface facing the bottom surface,
the second coupling part including a pull member having a corresponding number of second protuberances, the second protuberances being separated and arranged at a distance from each other along a circumferential direction with respect to the longitudinal axis by a corresponding number of second recesses, the second protuberances each forming a respective second contact surface, wherein the second contact surfaces being formed to abut and be pressed against a respective one of the first contact surfaces by the pull member, the first contact surfaces forming an acute angle with the center axis, and the second contact surfaces forming an acute angle with the longitudinal axis, wherein the acute angle of the first contact surfaces is configured to allow a force to be formed that is radially outwardly directed and acts on the conical pin, which force contributing to an outer surface of the conical pin abutting and being pressed against an conical inner surface of the seat, at least radially outside the protuberances and the first contact surfaces.

11. The tool coupling according to claim 10, wherein the second coupling part includes an operating mechanism, which acts on the pull member such that the pull member is rotatable on the longitudinal axis from a first rotational position to a second rotational position, in which the first and second contact surfaces are positioned right opposite each other, and from the second rotational position displaceable in the direction of the longitudinal axis to a coupling position, in which the first and second contact surfaces are pressed against each other and the first coupling part and the second coupling part interconnect with each other.

12. The tool coupling according to claim 11, wherein the pull member includes a drawbar and a pull head, on which the second contact surfaces are arranged.

13. The tool coupling according to claim 12, wherein the operating mechanism includes a control member having an engagement member, which is accessible for an operating tool, and wherein the control member is rotatable on the longitudinal axis for the rotation of the pull member between the first rotational position and the second rotational position.

14. The tool coupling according to claim 13, wherein the control member is rotatably arranged in the second coupling part on an axis perpendicular to the longitudinal axis, and wherein the control member includes an eccentric circumferential surface, which acts in a transverse opening of the pull member for said displacement to the coupling position.

15. The tool coupling according to any claim 10, wherein each first protuberance has an interior surface facing the center axis and a smallest extension in the circumferential direction along the interior surface, and wherein the smallest extension is less than said distance between the first protuberances.

16. The tool coupling according to claim 10, wherein the first contact surfaces are conical.

17. The tool coupling according to claim 10, wherein the first body forms a first support surface around the conical pin, and wherein the first support surface is formed to abut against an opposite second support surface of the second coupling part.

18. The tool coupling according to claim 17, wherein the first support surface is flat, and wherein the center axis is perpendicular to the first support surface.

19. The tool coupling according to claim 10, wherein the first coupling part is formed to allow securing of the conical pin in at least one determined rotary position on the center axis in relation to the second coupling part.

20. The tool coupling according to claim 19, wherein the conical pin has a polygonal external cross-section with respect to the center axis for co-operation with a corresponding cross-section of the conical seat of the second coupling part for securing the conical pin.

21. The tool coupling according to claim 20, wherein the polygonal external cross-section of the conical pin is a rounded corner, each first recess being arranged radially inside a respective rounded corner.

22. The tool coupling according to claim 21, wherein the cavity has a circular shape, the first protuberances extending inward toward the center axis from the circular shape.

* * * * *